(12) United States Patent
Kemeny

(10) Patent No.: US 6,517,060 B1
(45) Date of Patent: *Feb. 11, 2003

(54) MICRO VIBRATION ISOLATION DEVICE

(75) Inventor: Zoltan A. Kemeny, Tempe, AZ (US)

(73) Assignee: Vistek Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,179

(22) Filed: Apr. 26, 2000

Related U.S. Application Data

(60) Provisional application No. 60/060,071, filed on Sep. 26, 1997, provisional application No. 60/065,439, filed on Sep. 29, 1997, and provisional application No. 60/069,289, filed on Dec. 11, 1997.

(51) Int. Cl.⁷ ................................................ F16M 1/00
(52) U.S. Cl. ........................ 267/136; 168/379; 168/380
(58) Field of Search ................................. 267/136, 161, 267/162, 164; 248/562, 638, 559; 188/379, 380

(56) References Cited

U.S. PATENT DOCUMENTS

| 3,770,232 A | * | 11/1973 | Blake | 267/136 |
| 3,856,242 A | * | 12/1974 | Cook | 267/162 |
| 4,236,606 A | * | 12/1980 | Sunakoda et al. | 188/381 |
| 4,422,351 A | * | 12/1983 | Kraus | 74/798 |
| 5,106,348 A | * | 4/1992 | Koivunen | 475/126 |
| 5,310,157 A | * | 5/1994 | Platus | 248/619 |
| 5,390,892 A | * | 2/1995 | Platus | 248/619 |
| 5,456,047 A | * | 10/1995 | Dorka | 248/638 |
| 5,549,270 A | * | 8/1996 | Platus et al. | 248/619 |
| 5,669,594 A | * | 9/1997 | Platus et al. | 248/619 |
| 5,884,738 A | * | 3/1999 | Joslin et al. | 192/35 |

FOREIGN PATENT DOCUMENTS

WO  WO 99/17033  * 4/1999

* cited by examiner

Primary Examiner—Matthew C. Graham
Assistant Examiner—Mariano Sy
(74) Attorney, Agent, or Firm—Snell & Wilmer

(57) ABSTRACT

The present invention relates to a passive vibration isolation device for broadband suppression of vibrations. The device preferably comprises either a vertical spring filter, a horizontal spring filter, or a combination of the two. The vertical spring filter comprises non-linear spring devices such as Belleville washers, ZK washers, crest-to-crest springs or the like stacked in series, in parallel, or any combination thereof. ZK washers are washers which comprise multiple integral concentric rings of varying conicity. The device further may optionally comprise a screw, belt or similar device for adjusting the aspect ratio of the vertical spring. The device further may optionally comprise a screw or similar device for adjusting the static load placed on the vertical spring. The horizontal spring filter may comprise any number of bearings retained within a conical raceway disposed between two cylindrical plates. The vibration isolation device then may be placed beneath a machine, or a platform supporting a machine, to isolate vibrations otherwise transmissible from the floor to the machine or vice versa.

10 Claims, 21 Drawing Sheets

MICRO VIBRATION ISOLATION DEVICE

This application claims the benefit of U.S. Provisional Application No. 60/060,071, filed Sep. 26, 1997, U.S. Provisional Application No. 60/065,439, filed Sep. 29, 1997, and U.S. Provisional Application No. 60/069,289, filed Dec. 11, 1997.

TECHNICAL FIELD

The present invention generally relates to a device for controlling transmission of vibrations from machinery to their environment and vice-versa. More particularly, the present invention relates to a passive micro vibration isolator for the suppression of a broad band of vibration frequencies. The invention further relates to ZK washers for use in such isolators as an alternative to known Belleville washers.

BACKGROUND

In general, vibration originating from machines or other sources is most often undesirable and detrimental. For example, vibration in a precision machining tool may lead to faults and imperfections in work pieces produced on the tool. The vibration also may be transmitted through the floor and disrupt other tools. Additionally, the noise generally associated with machine vibration may be disruptive to workers.

Various methods and devices exist to reduce undesirable vibrations and may be generally categorized as vibration isolators or suppressors. Typically, vibration isolation devices operate locally to reduce transmissibility, wherein transmissibility is typically defined as the ratio of the transmitted force to the disturbing force. As such, vibration isolation devices are particularly suitable for reducing discrete and transient vibrations. For example, where a CMP machine may rest on a platform, various reflexive and absorptive materials such as rubber may be placed between the platform legs and the floor to isolate the machine from any vibrations coming from the floor.

Vibration mitigation devices may be categorized further as active or passive devices. Typically, active devices incorporate a feedback system which detects the amplitude and/or frequency of the disrupting vibration and responds accordingly to reduce or eliminate the vibration. Therefore, active devices are capable of broadband reduction of vibration. However, the complexity and cost of typical active devices often make them impractical for many applications.

In contrast, passive devices are typically mechanical devices which generally use various spring elements and damping elements to reduce or eliminate vibrations. However, conventional passive devices generally operate to reduce vibrations only in a fairly narrow bandwidth. Additionally, certain materials used in conventional passive devices, such as rubber and lubricating fluid, may be inappropriate for use in certain environments, such as clean room environments.

In conventional devices, a spring element is commonly used in combination with a beam-column element to reduce the transmission of vibration. See U.S. Pat. No. 5,178,357, issued on January 1993, to Platus and related U.S. Pat. No. 5,549,270, issued on August 1996, to Platus et al. More particularly, a spring and a beam-column are calibrated such that one element has a positive stiffness and the other element has an equal negative stiffness. In this manner, an object is supported with near-zero effective stiffness. However, a spring and beam-column pair is required for each axis to be isolated from vibration and each spring and beam-column pair must be precisely calibrated to achieve a net-zero effective stiffness in each axis. As such, this method is fairly complicated and difficult to calibrate and adjust. Additionally, as the requisite negative and positive stiffness are achieved through two separate elements, if one element wears at a rate different than that of the other, their stiffness will no longer match and a net-zero effective stiffness will not be achieved. Moreover, conventional devices typically require a good deal of maintenance and are too sensitive or fragile to support large, heavy and especially sensitive equipment such as CMP machines and powerful microscopes.

SUMMARY OF THE INVENTION

The present invention relates to a passive vibration isolation device for reducing vibration transmissibility in a broad frequency range. In a preferred exemplary embodiment of the present invention, a vibration isolation device includes a plurality of net-zero or near-zero effective stiffness elements. More particularly, a configuration of balls trapped between raceways is used in combination with springs, conic washers and the like with substantially zero tangent stiffness at large secant stiffness, such as, for example, non-linear springs, Belleville, ZK washers or any combination of the same. In addition, another configuration facilitates the reconfiguration of the non-linear springs to tune them for lighter and heavier loads.

BRIEF DESCRIPTION OF THE DRAWING FIGURES

The present invention will hereinafter be described in conjunction with the appended drawing figures, wherein like numerals generally denote like elements, and:

Figures 30A, 30B:
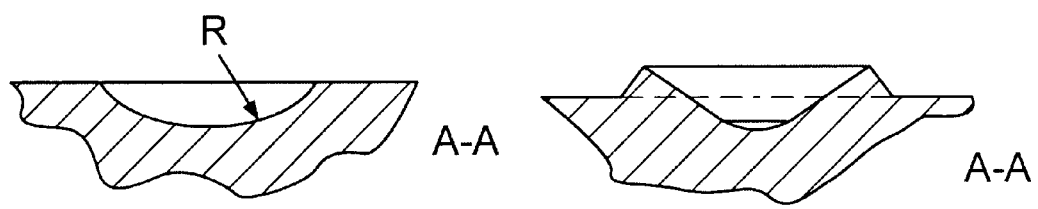
Figure 31:
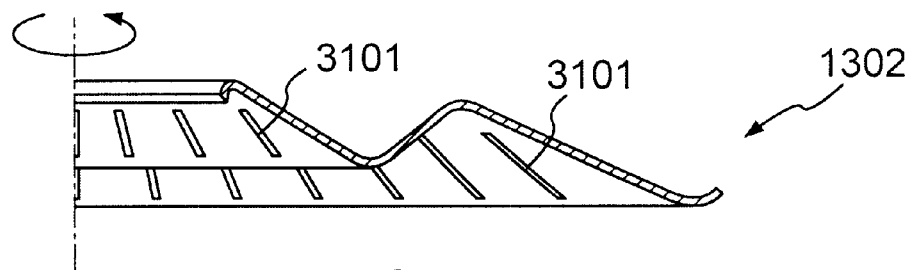
Figure 32:
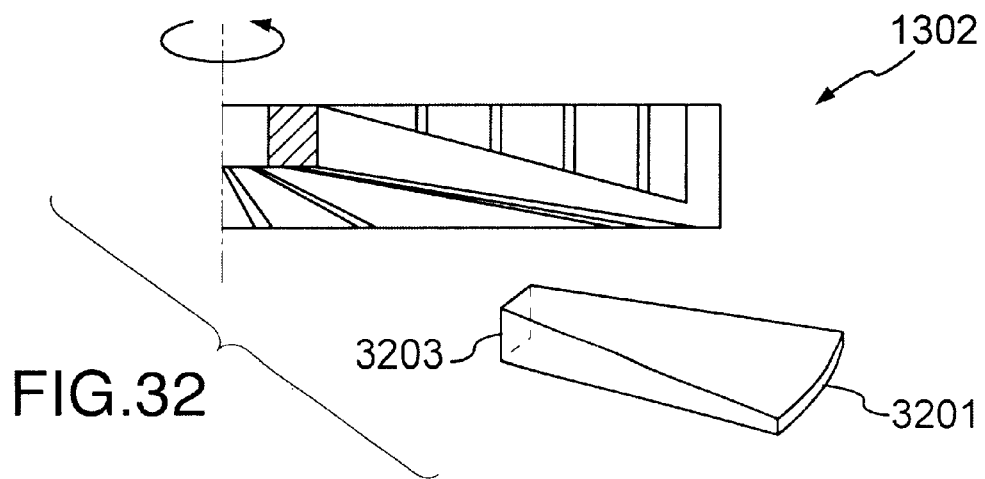
Figure 33:
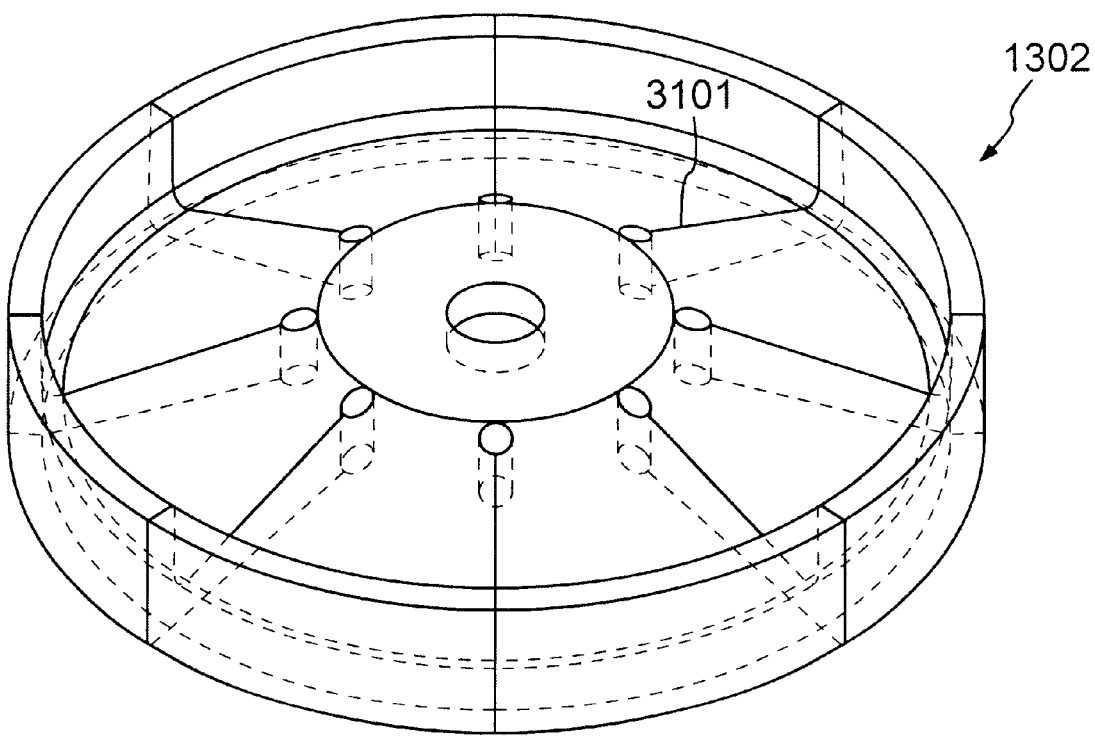

FIGS. 30a, b are cross-sectional views of alternative embodiments of a VID;

FIG. 31 is a cross-sectional views of an embodiment of a ZK washer of the present invention;

FIG. 32 is a cross-sectional view of an alternative embodiment of a ZK washer of the present invention; and FIG. 33 is a cross-sectional view of another alternative embodiment of a ZK washer of the present invention.

DETAILED DESCRIPTION OF THE INVENTION

A vibration isolation device ("VID") according to various aspects of the present invention provides a suitable system for reducing the transmissibility of micro vibrations between the environment and vibration sensitive or vibration generating equipment such as Chemical Mechanical Planarization ("CMP") machines, silicon wafer and memory disk polishers and grinders, silicon ingot slicers, lithographic equipment, microscopes, and the like. In order to provide a more thorough understanding of the present invention, the following description sets forth numerous specific details, such as specific parameters, components, and the like. However, these specific details need not be employed to practice this invention.

Figure 1:
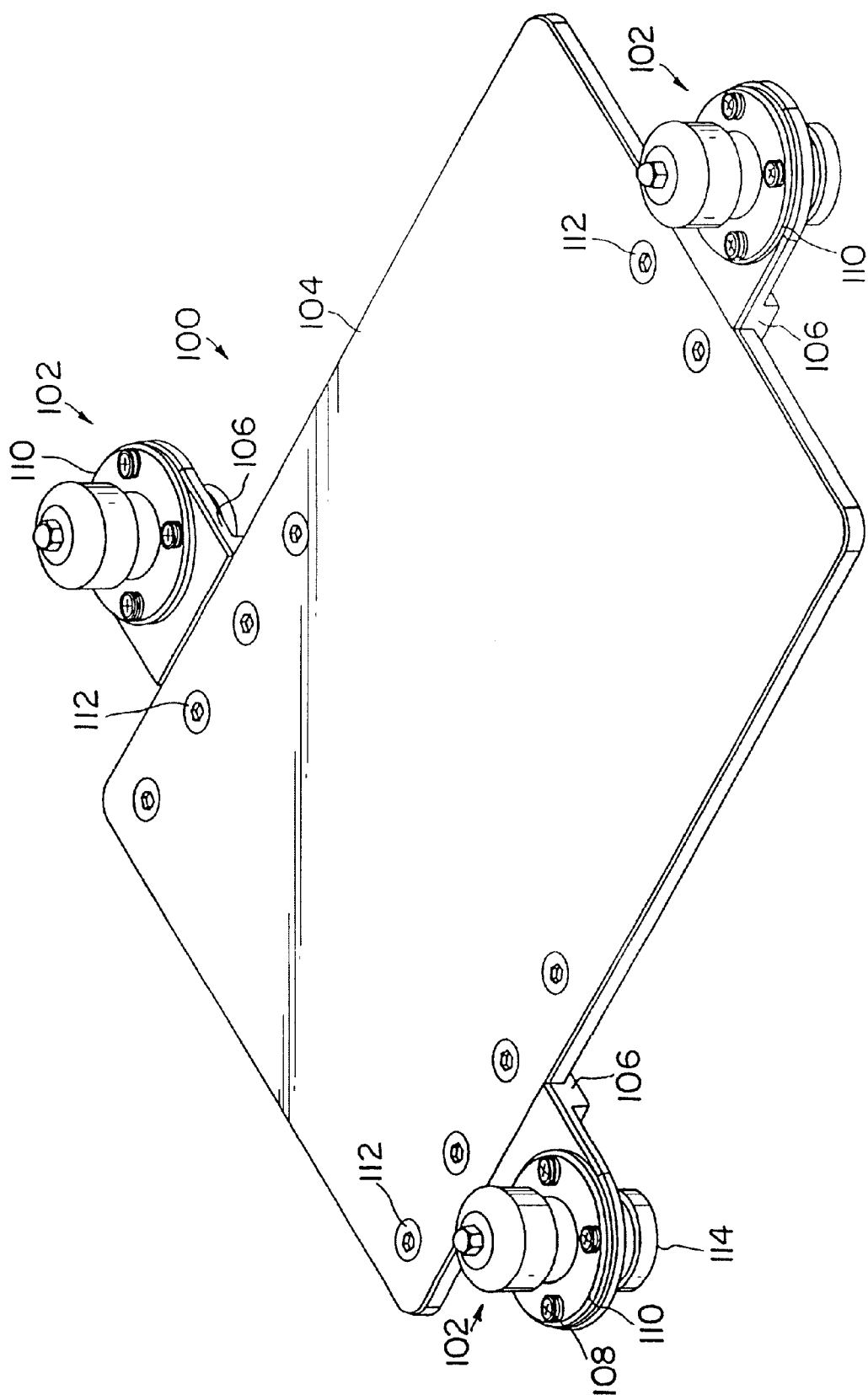
FIG. 1 is a perspective view of a vibration isolation platform supported by three vibration isolation devices ("VIDs"), in accordance with an embodiment of the present invention.

With reference to FIG. 1, a plurality VIDs 102 are suitably integrated into vibration isolation platform 100. More particularly, a plurality of bolts 108 attach collars 110 of VIDs 102 to mounting brackets 106, which are attached in turn to platform 104 by a plurality of bolts 112. However, VIDs 102 may be attached to platform 104 using any other convenient method. For example, VIDs 102 may be welded onto platform 104. Alternatively, VIDs 102 may be attached directly to the device to be supported.

VID 102 includes a plurality of nonlinear spring assemblies to isolate the transmission of micro vibrations in up to six degrees of freedom across a broadband of vibration frequencies. More particularly, with reference to FIG. 2, in the present embodiment, VID 102 includes a configuration of a plurality of balls 204 disposed between raceways 222 and 224 for broadband vibration isolation primarily in the x-y plane and a plurality of conic washers 206 and 208 for vibration suppression in the y-z and x-z planes, and about the x and y axes. Preferably, raceways 222, 224 are circular, though, raceways 222, 224 may be other alternative configurations, such as for example, dimples 3301 and the like. Raceways 222, 224 generally have a substantially spherical contour, but may likewise comprise semi-conical configurations and the like as well.

Lower section 114 and upper section 202 are suitably configured with substantially matching circular raceways 222 and 224, respectively, with substantially conic cross-sectional profiles and rounded apexes. In a preferred embodiment, the apex radii of raceways 222 and 224 are large compared to the radius of balls 204. Raceways 222 and 224 may be formed using any convenient method. For example, sections 114 and 202 may be cast or molded with raceways 222 and 224. Alternatively, raceways 222 and 224 may be milled or machined into sections 114 and 202. Additionally, sections 114 and 202 may be formed from any suitable rigid material (e.g., metal, ceramic, and the like). In a most preferred embodiment, sections 114 and 202 are formed from steel.

A plurality of balls 204 are disposed between raceways 222 and 224 within a plurality of holes formed in retainer ring 220. In the present embodiment, three balls are used and, accordingly, three holes are formed in retainer ring 220. More particularly, retainer ring 220 preferably maintain the balls at substantially even spacings of about 120 degrees to facilitate equal distribution of the weight of the device to be supported. Depending on the particular application, however, any number of balls may be disposed at any desirable intervals. For example, six balls spaced at 60 degree increments may be used to support heavier loads. Additionally, plurality of balls 204 may be formed from a suitable hard and smooth material (e.g., steel, aluminum, and the like).

Figure 3:
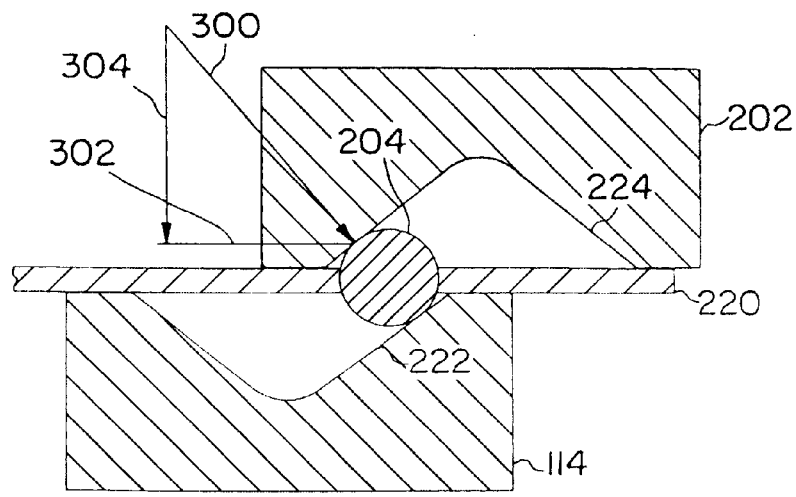
FIG. 3 is a cross-sectional view of a portion of the device shown in FIG. 2.

When VID 102 is not displaced is the x-y plane, plurality of balls 204 rest at the apexes of raceways 222 and 224. With reference to FIG. 3, when base section 114 and/or upper section 202 are displaced along the x-y plane, ball 204 displaces onto the sloped walls of raceways 222 and 224 (for sake of clarity, only one ball is shown and described). Force 300, due to gravity, is applied normal to the surface sloped walls of raceways 222 and 224. Force 300 can be resolved into horizontal force 302 and vertical force 304. Horizontal force 302 thus acts as a restorative force to restore ball 204 to its rest position, thereby restoring VID 102. Additionally, retainer ring 220 contributes a small amount of dampening due to friction. Accordingly, retainer ring 220 is preferably formed a polytetrafluoroethylene material, such as the commercial product TEFLON®, or other suitable low friction material.

Moreover, as the slope of raceways 222 and 224 are substantially constant, the restorative force (i.e., horizontal force 302) is substantially constant and independent of the frequency and amplitude of displacements in the x-y plane within the stroke range of raceways 222 and 224 (i.e., substantially the cross-sectional width of raceways 222 and 224). Accordingly, the configuration of plurality of balls 204 trapped between raceways 222 and 224 preferably has no natural frequency, and provides substantially broadband vibration isolation in the x-y plane.

Figure 2:
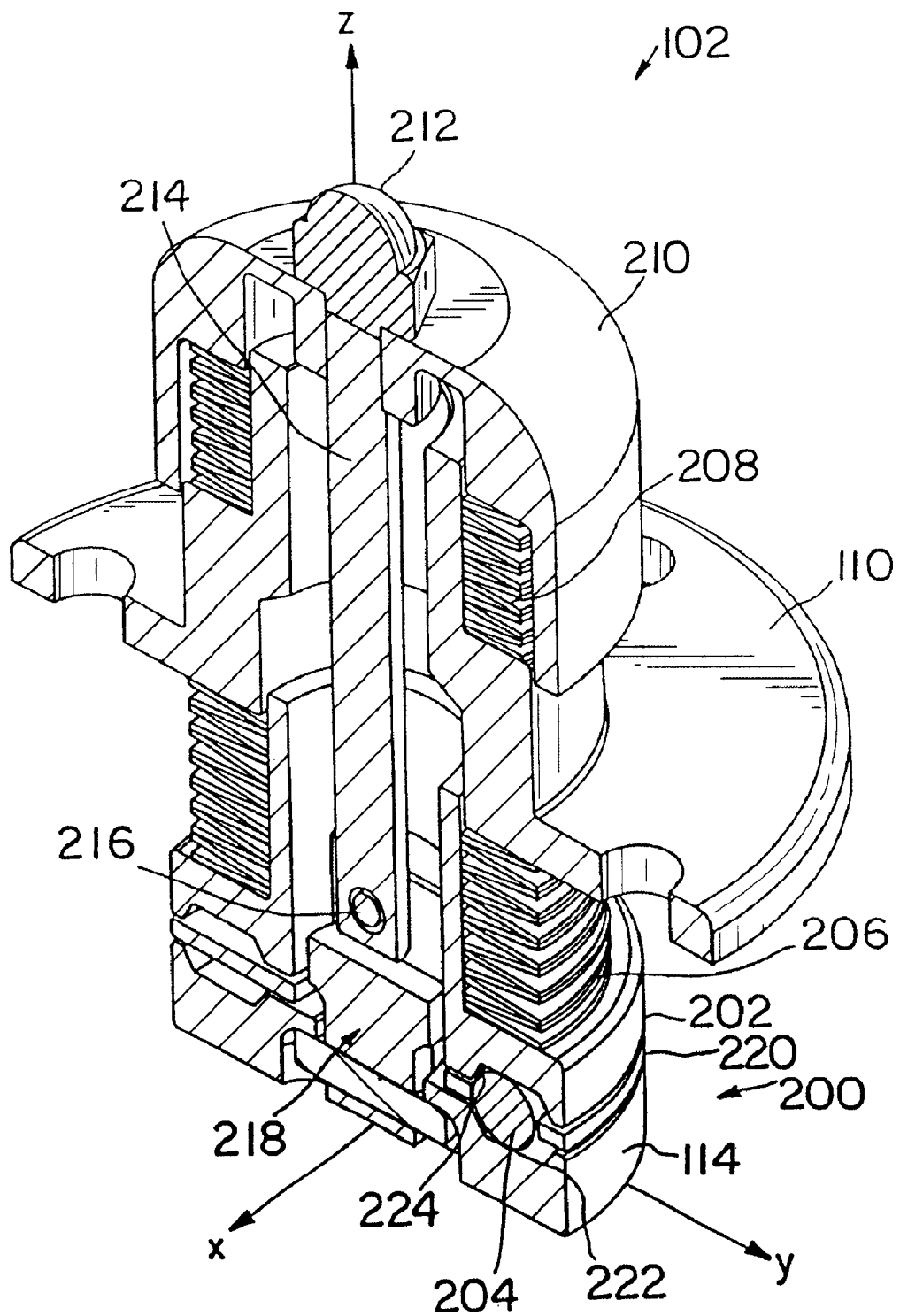
FIG. 2 is a perspective view of one of the VIDs shown in FIG. 1 with portions of the embodiment shown removed.
Figure 27:
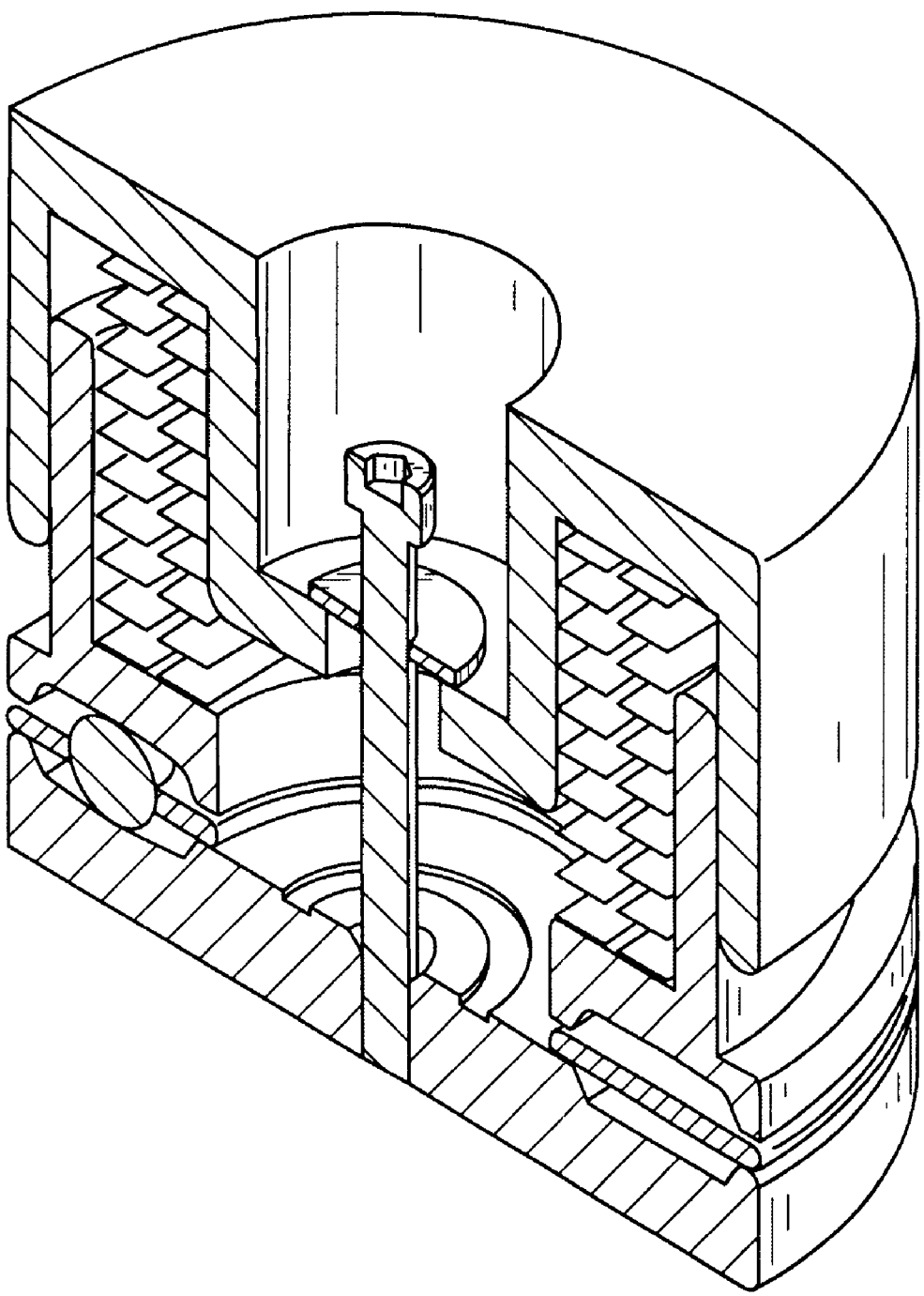
FIG. 27 is a perspective view of a VID employing crest-to-crest springs.

In accordance with an exemplary embodiment of the present invention, with reference to FIGS. 2, 3, and 27, a first non-linear spring device 206 is disposed between upper section 202 and collar 110 and a second non-linear spring device 208 is disposed between collar 110 and load-adjustment cap 210. First and second non-linear spring devices 206,208 are suitably comprised of any material and/or device which exhibits non-linear spring characteristics including substantially high secant stiffness for large amplitude vibrations and substantially zero tangential stiffness for micro vibrations. For example, non-linear spring devices 206,208 may comprise standard non-linear springs, Belleville washers, ZK washers and the like, or any combination thereof. For ease of reference, any of the non-linear spring devices may be referred to in the following description as simply "conical washers." In a preferred embodiment, with reference to FIG. 27, non-linear spring devices 206,208 are "crest-to-crest" springs such as those manufactured by Smalley Steel Ring Co. of Wheeling, Ill.

Further, with reference now to FIG. 2, non-linear spring devices 206,208 may be conic washers such as Belleville or ZK washers disposed between upper section 202 and collar 110 between collar 110 and load cap 210.

Figure 28:
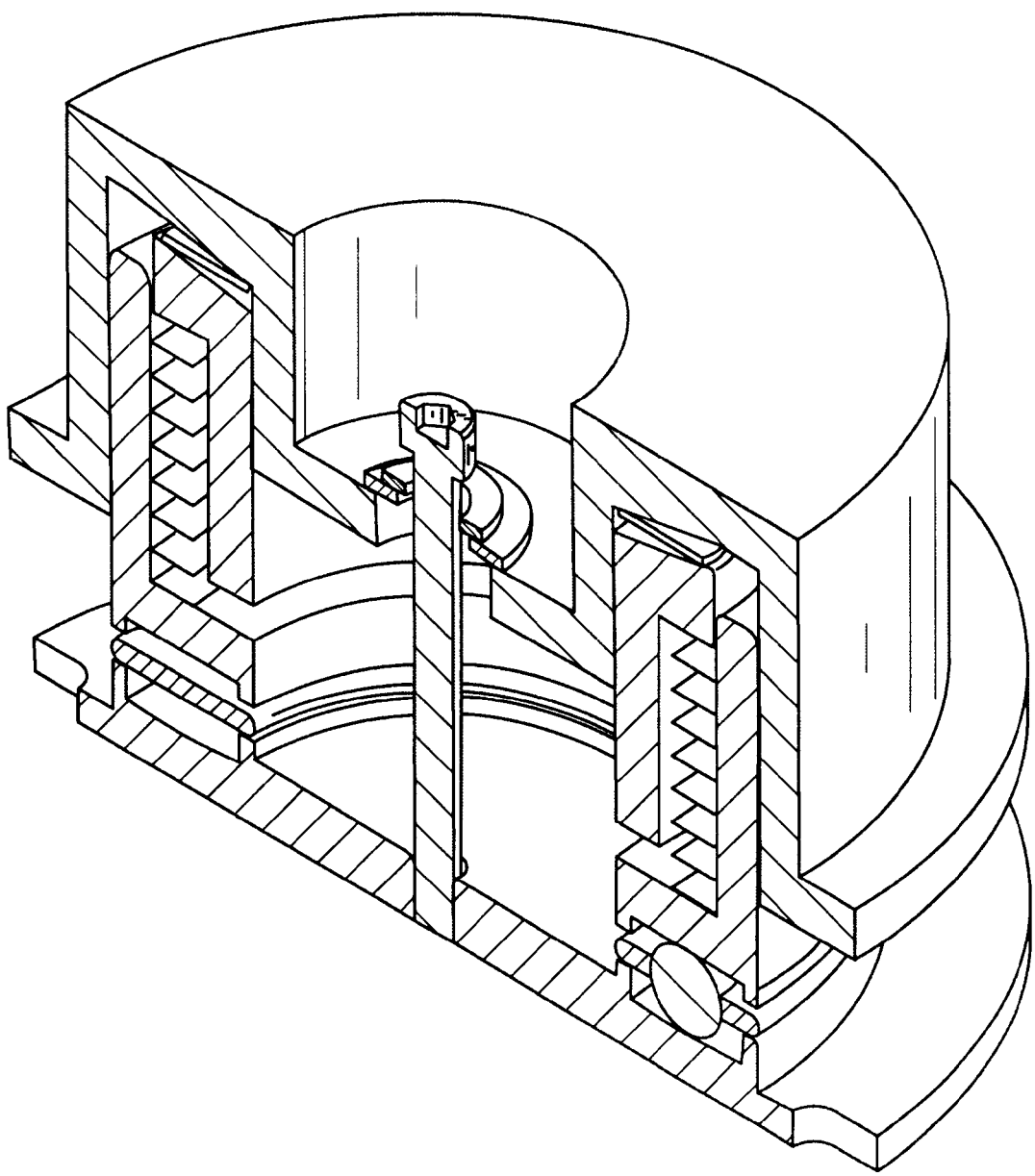
FIG. 28 is a perspective view of a VID employing a combination of ZK washers and crest-to-crest springs.
Figure 29:
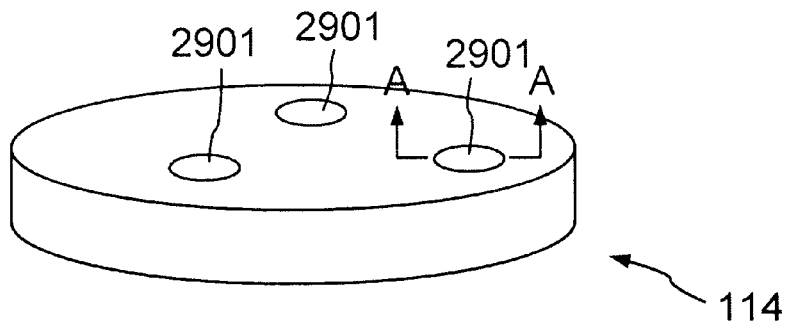
FIG. 29 is a perspective view of a an alternative embodiment of a VID.

Still further, any combination of washers and springs which exhibit the aforementioned characteristics may be substituted in the present invention. For example, with reference to FIG. 28, ZK washers may be disposed between upper section 202 and collar 110 and crest-to-crest springs may be disposed between collar 110 and load cap 210, or vice versa.

Figure 4:
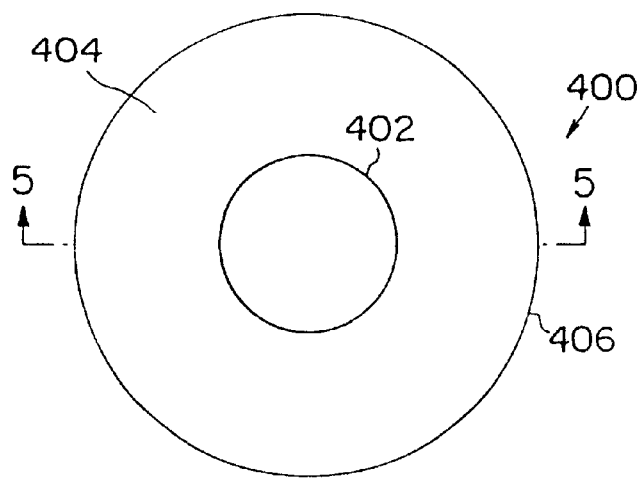
FIG. 4 is a top plan view of a Belleville washer in accordance with the present invention.
Figure 5:
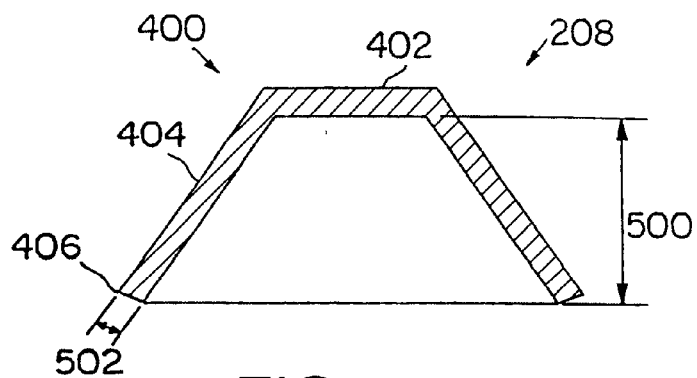
FIG. 5 is a cross sectional view of the Belleville washer shown in FIG. 4 taken through line 5—5.

In one exemplary embodiment of the present invention, conic washers 206 may include Belleville washers suitably configured to exhibit substantially zero tangential stiffness and high secant stiffness. More particularly, with reference to FIGS. 4 and 5, Belleville washer 400 is suitably configured with conic section 404 extending from inner circumference 402 to concentric outer circumference 406. When a compressive pressure is applied along circumferences 402 and 406, Belleville washer 400 responds with a stiffness characteristic determined in part by its aspect ratio (i.e., the ratio of height 500 to thickness 502). More particularly, Belleville washers with an aspect ratio of about 1.5 are known to have substantially zero tangential stiffness and high secant stiffness in the stroke range of about 2h/3 to h, where h is height 500.

Figure 6:
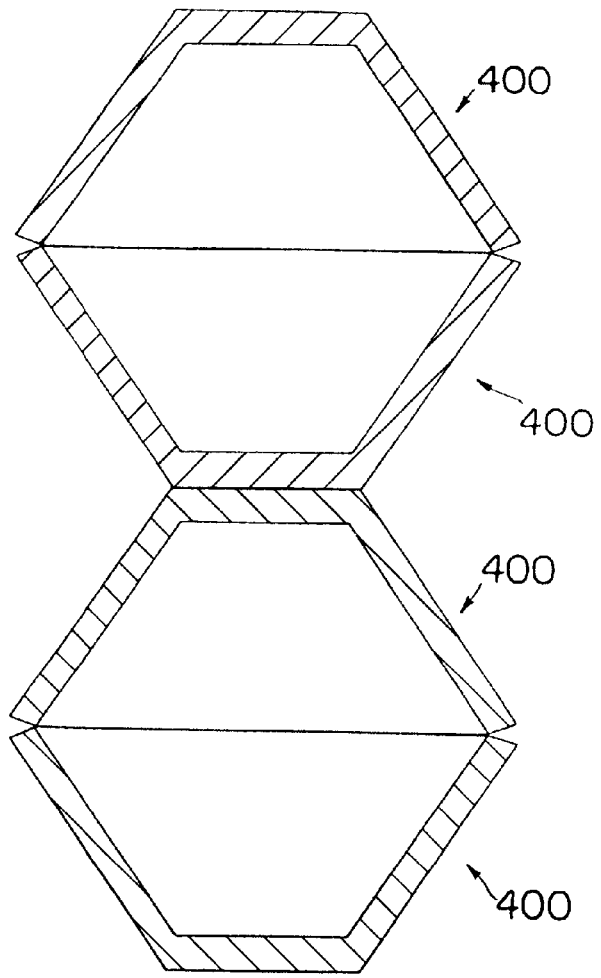
FIG. 6 is a cross sectional view of Belleville washers stacked in a serial arrangement, in accordance with the present invention.
Figure 7:
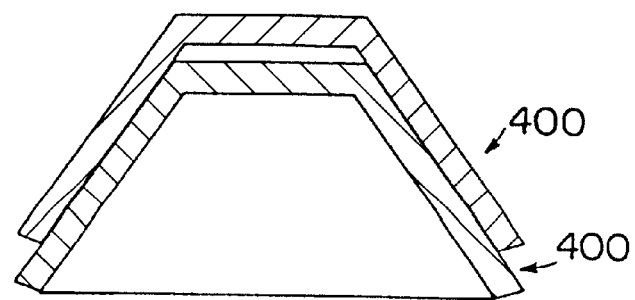
FIG. 7 is a cross sectional view of Belleville washers stacked in a parallel arrangement, in accordance with the present invention.

With additional reference to FIGS. 6 and 7, Belleville washers may be stacked in series (as depicted in FIG. 6), in parallel (as depicted in FIG. 7), or any combination thereof to increase their ability to support heavier loads. The stacking of Belleville washers, however, increases the profile of VID 102, which may be undesirable in some applications. For example, a VID 102 with a tall profile may raise the load to an undesirable or inoperable height.

Figure 8:
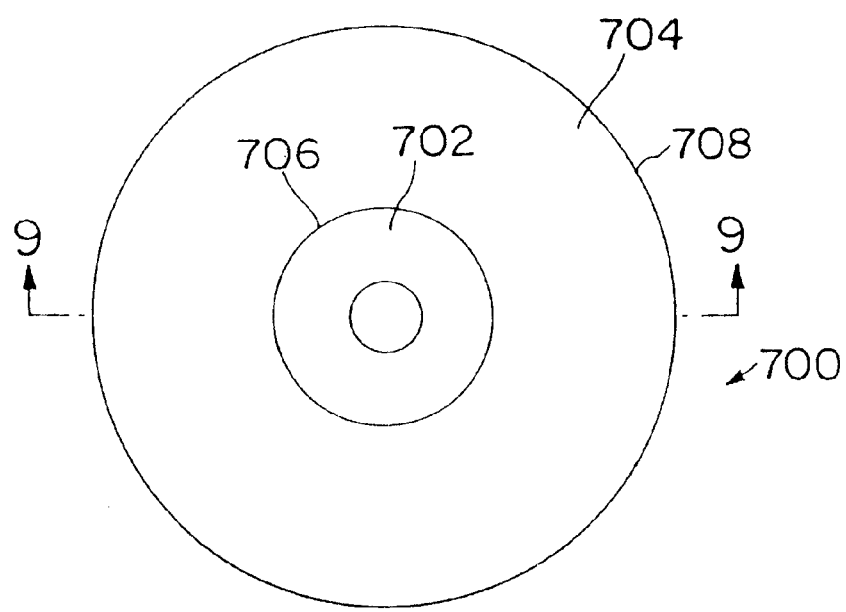
FIG. 8 is a top plan view of a ZK washer used in accordance with the present invention.
Figure 9:
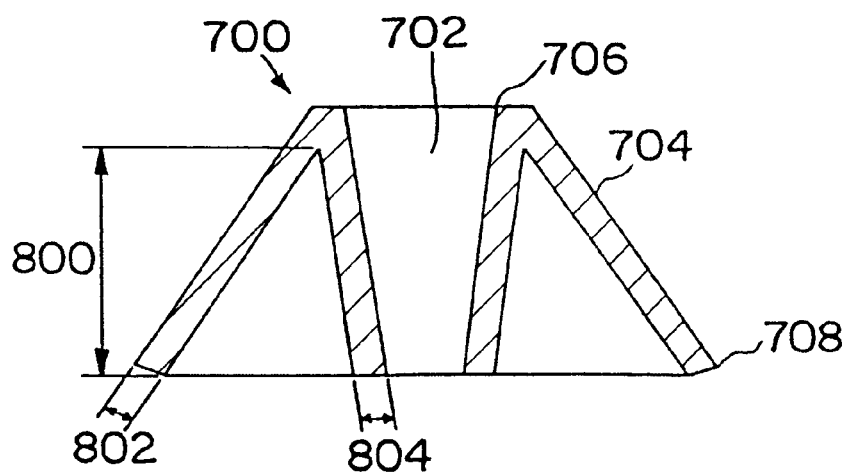
FIG. 9 is a cross sectional view of the ZK washer shown in FIG. 8 taken through line 9—9.

Alternatively, conical washers 206 may include ZK washers which provide substantially zero tangential stiffness and high secant stiffness similar to Belleville washers, but are capable of supporting heavier loads. More particularly, with reference to FIGS. 8 and 9, ZK washer 700 includes concentric sections 702 and 704. Section 702 has high aspect ratio h/t (i.e., ratio of height 800 to thickness 804), and section 704 has low aspect ratio h/t (i.e., ratio of height 800 to thickness 802). In a preferred embodiment, section 702 and 704 have aspect ratios of about 2 and 0.8, respectively. Thus, the tangent stiffness of sections 702 and 704 are substantially equal and of opposite sign in the h/6 vicinity of 2h/3 stroke, where h is height 800. However, the tangent stiffness of section 704 is preferably slightly higher than that of section 702 to prevent failure of section 702. Additionally, the aspect ratios of sections 702 and 704 may be reversed without altering the performance characteristics of the ZK washer. In this manner, similar to Belleville washers, ZK washer 700 provides substantially zero tangential stiffness and high secant stiffness in the range of 2h/3 to h, where h is height 800. However, in comparison to Belleville washers, ZK washer 700 has a smaller height profile, and is capable of supporting heavier loads. Additionally, similar to Belleville washers, ZK washers may be stacked in series, parallel, or any combination thereof.

Figure 10:
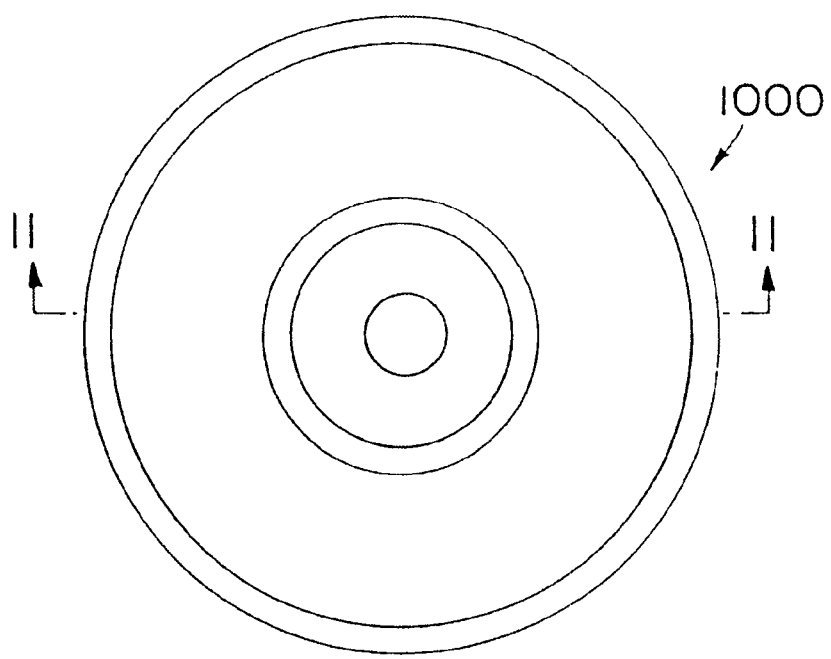
FIG. 10 is a top plan view of another ZK washer in accordance with the present invention.
Figure 11:
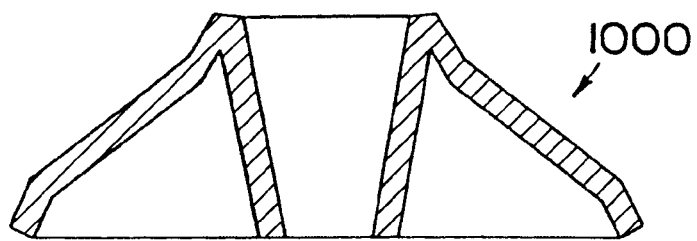
FIG. 11 is a cross sectional view of the ZK washer shown in FIG. 10 taken through line 11—11.
Figure 12:
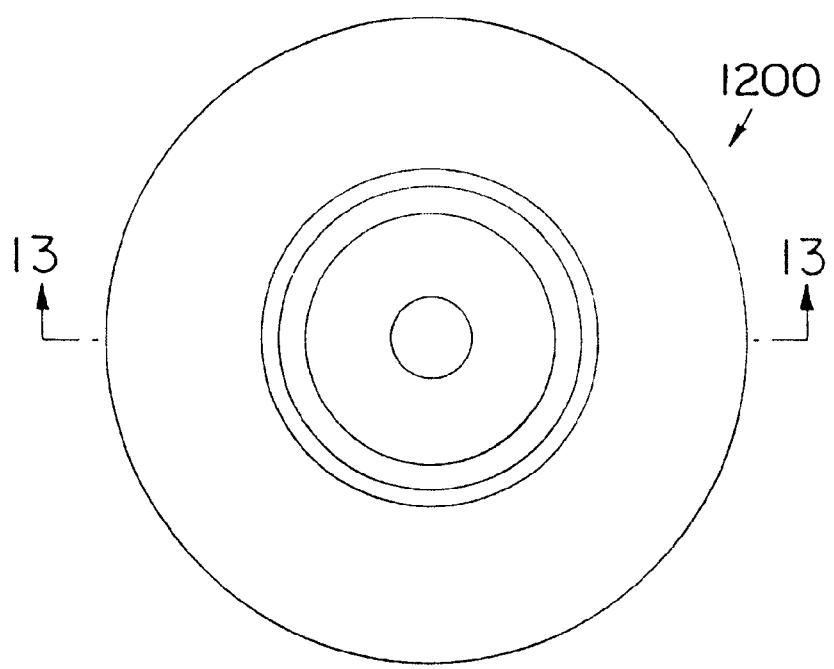
FIG. 12 is a top plan view of yet another ZK washer in accordance with the present invention.
Figure 13:
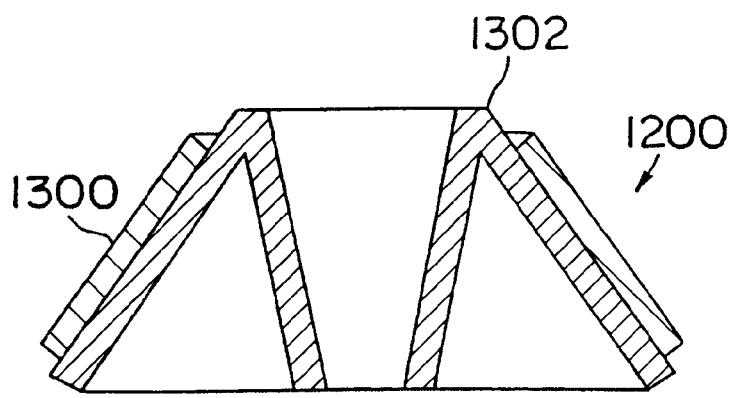
FIG. 13 is a cross sectional view of the ZK washer shown in FIG. 12 taken through line 13—13.
Figure 14:
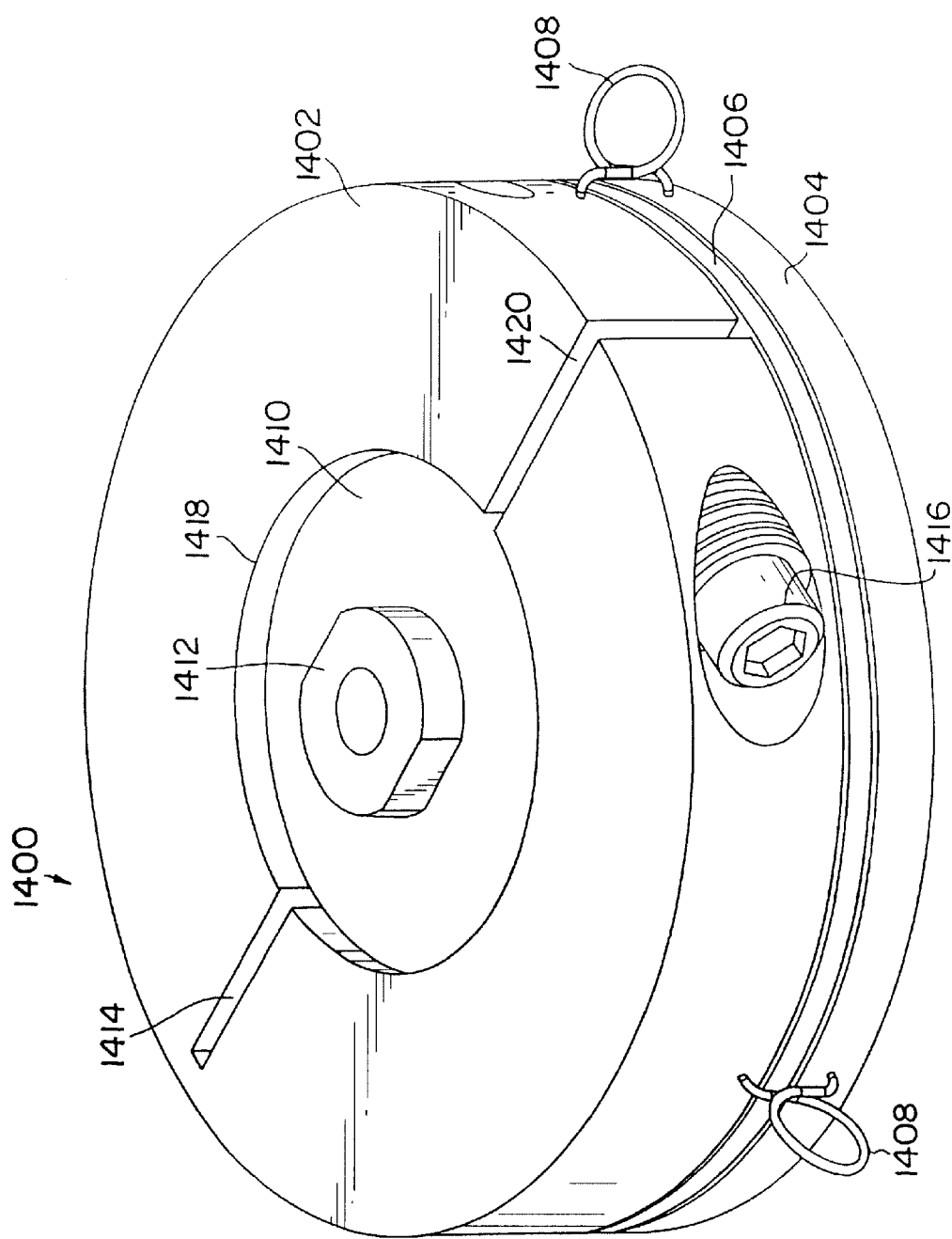
FIG. 14 is a perspective view of a VID in accordance with another embodiment of the present invention.

ZK washers may be formed using any convenient methods. For example, in the present embodiment, ZK washer 700 is suitably formed by machining sections 702 and 704. With reference to FIGS. 10 and 11, ZK washer 1000 is suitably stamped. Alternatively, with reference to FIGS. 12 and 13, composite washer 1200 may be formed by attaching Belleville washer 1300 to ZK washer 1302. In accordance with another aspect of the present invention, with reference to FIGS. 31–33, ZK washer may be provided with slots 3101. Generally, slots 3101 may be formed in ZK washer 1302 in any suitable manner, such as by machining, stamping and the like. Preferably, slots 3101 are formed using an electro-discharge machine (EDM). In accordance with one aspect of the present invention, with reference to FIGS. 31 and 32, ZK washers 1302 may have arcuate shaped roots 3203 and tips 3201 on each segment of washer 1302.

Figure 19:
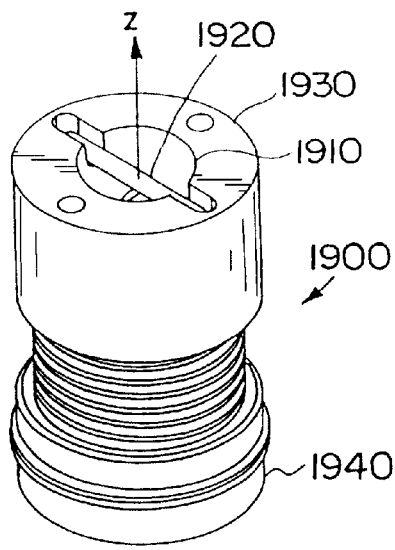
FIG. 19 is a top perspective view of a VID in accordance with another embodiment of the present invention.
Figure 20:
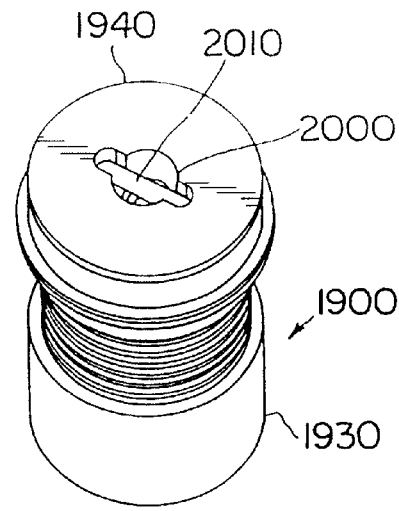
FIG. 20 is a bottom perspective view of the VID shown in FIG. 19.
Figure 21:
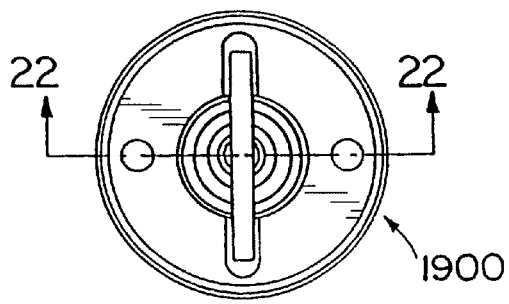
FIG. 21 is a top plan view of the VID shown in FIG. 19.
Figure 22:
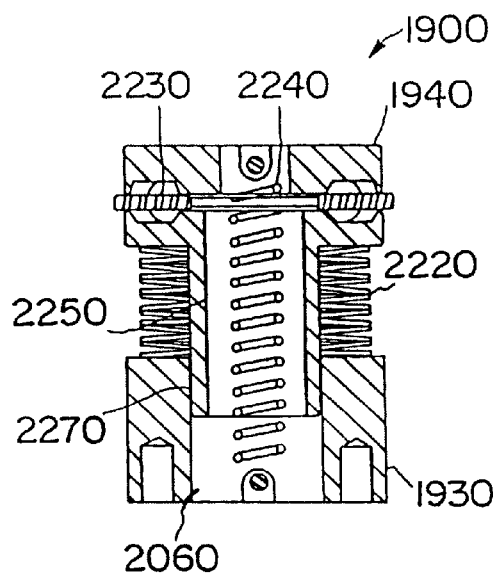
FIG. 22 is a cross section view of the VID shown in FIG. 19 taken through line 22—22.
Figure 23:
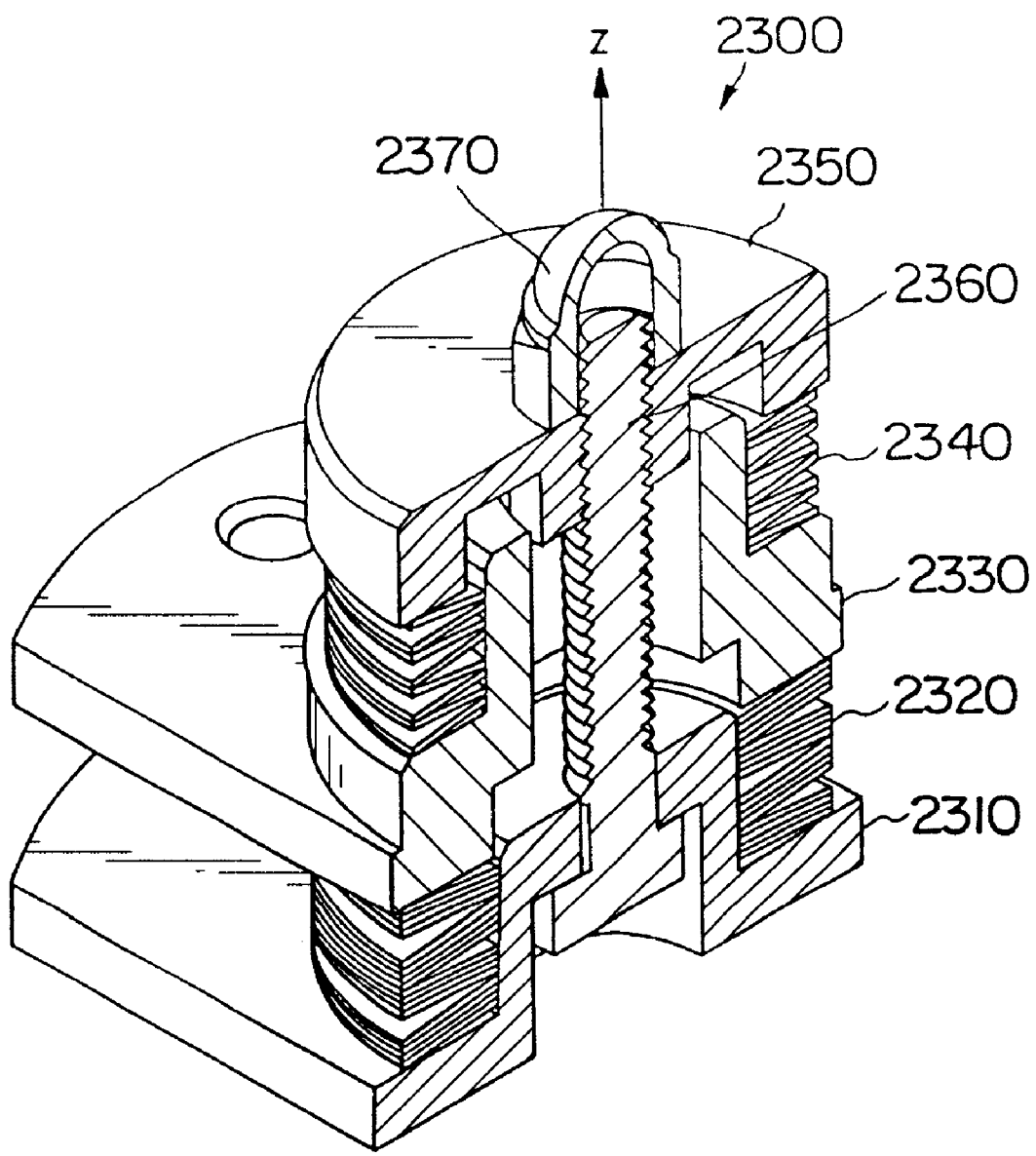
FIG. 23 is a perspective view of a VID in accordance with another embodiment of the present invention with portions of the embodiment shown removed.

In accordance with one aspect of the present invention, with reference to FIGS. 19 and 23, VID 102 may be manufactured and configured to work only within a range of predetermined loads. However, in accordance with an alternative aspect of the present invention VID 102 and/or conic washers 206 and 208 may be reconfigured and/or adjustable for lighter or heavier loads.

For example, with reference to FIG. 2, load-adjustment nut 212 may be rotated about threaded shaft 214 to appropriately lower or raise load-adjustment cap 210. In this manner, conic washers 206 and 208 may be appropriately calibrated to provide near zero tangential stiffness and high secant stiffness for lighter or heavier loads. For example, for lighter loads, the aspect ratios of conic washers 206 and 208 are appropriately reduced by appropriately loosing adjustment nut 212, thus raising adjustment cap 210. For heavier loads, the aspect ratios of conic washers 206 and 208 are appropriately increased by appropriately tightening adjustment nut 212, thus lowering adjustment cap 210. Alternatively, conic washers 208 may be known compression springs such that they primarily pre-compress conic, washers 206. Additionally, bolt 214 is pivotally attached at bottom end 216 to base anchor 218 to facilitate displacement of VID 102 about the x-axis.

As VID 102 does not require power supplies or lubrication, it is particularly well suited for use in clean room environments. In a preferred embodiment, VID 102 is formed substantially entirely of steel, aluminum, and TEFLON®.

Figure 15:
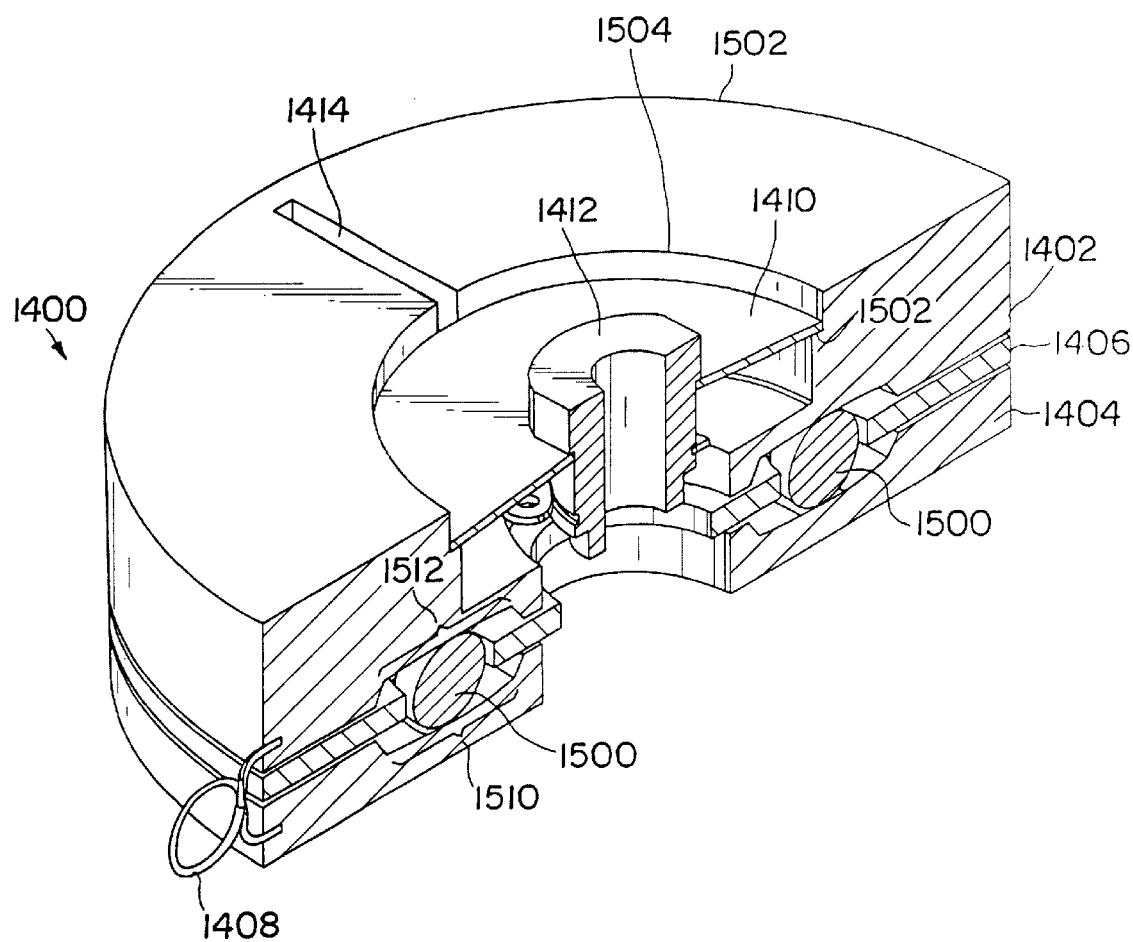
FIG. 15 is a perspective view of the VID shown in FIG. 14 with portions of the embodiment shown removed.

Referring now to FIGS. 14 through 17, in accordance with another aspect of the present invention, VID 1400 is suitably configured to permit adjustment of the spring aspect ratio of conic washer 1410. According to one exemplary embodiment, base ring 1412 is suitably configured in the center of conic washer 1410 for supporting a load. Conic washer 1410 is preferably disposed within substantially circular cavity 1418 formed in top section 1402. More particularly, as depicted in FIG. 15, a portion of the bottom surface of conic washer 1410 rests upon shoulder 1502 in cavity 1418, and the outer circumferential edge of conic washer 1410 contacts the inner circumferential surface of cavity 1418. The diameter of cavity 1418 may be adjusted by appropriately loosening or tightening adjustment screw 1416 to appropriately open or close gaps 1414 and 1420. Alternatively, an adjustable clamp, such as a hose clamp, may be fitted around the outer circumferential surface of top section 1402. In this manner, the aspect ratio of conic washer 1410 may be calibrated for use with lighter or heavier loads. For example, for lighter loads, the aspect ratio of conic washer 1410 is reduced by loosening adjustment screw 1416 to open gaps 1414 and 1420. For heavier loads, the aspect ratio of conic washer 1410 is increased by tightening adjustment screw 1416 to close 1414 and 1420.

In the present embodiment, conic washer 1410 includes substantially zero tangential stiffness elements (e.g., crest-to-crest springs, Belleville washers, ZK washers, and the like). As previously discussed, however, ZK washers may be configured to support heavier loads than other known conic washers, such as Belleville washers. As such, the vertical profile of VID 1400 may be reduced by using ZK washers and reduced still further using crest-to-crest springs. Therefore, in a most preferred embodiment, a single ZK washer is configured to operate with VID 1400. Configured in this manner, VID 1400 is particularly suited for isolating vibration at the legs of tools (e.g., CMP machines, lithography equipment, and the like).

Figure 16:
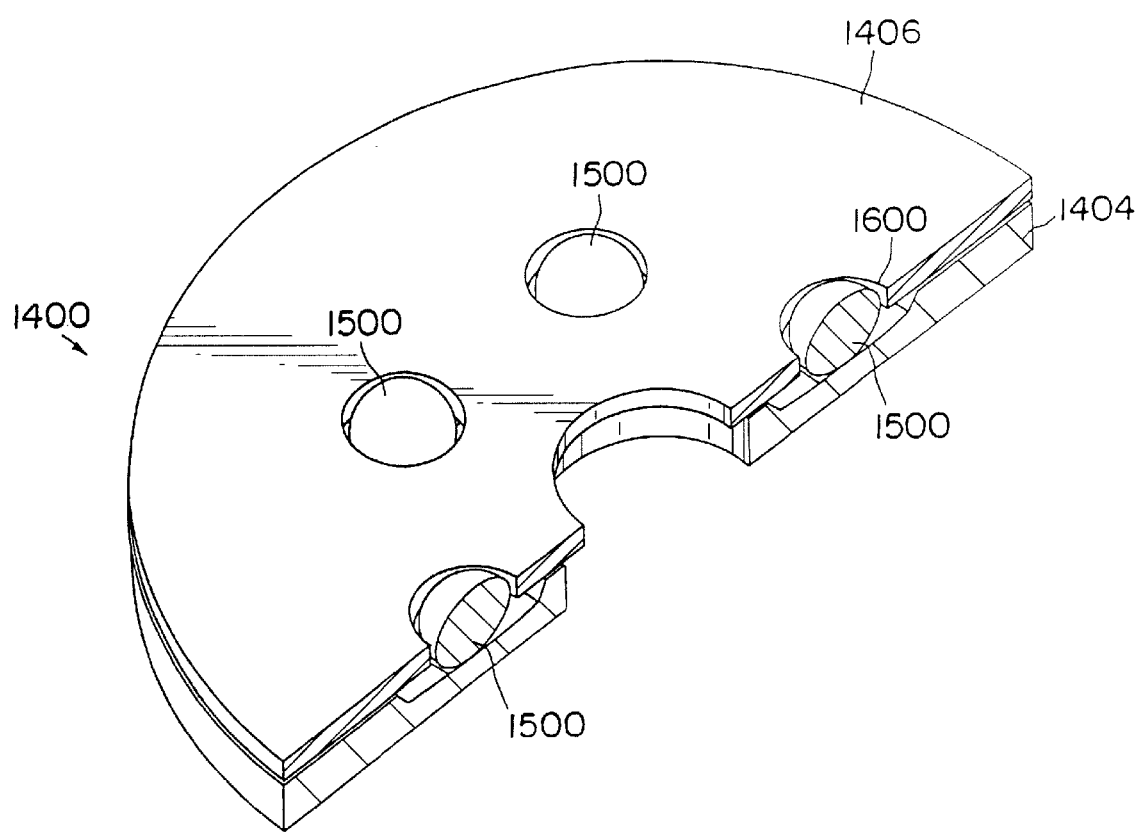
FIG. 16 is a another perspective view of the VID shown in FIG. 14 with portions of the embodiment shown removed.
Figure 17:
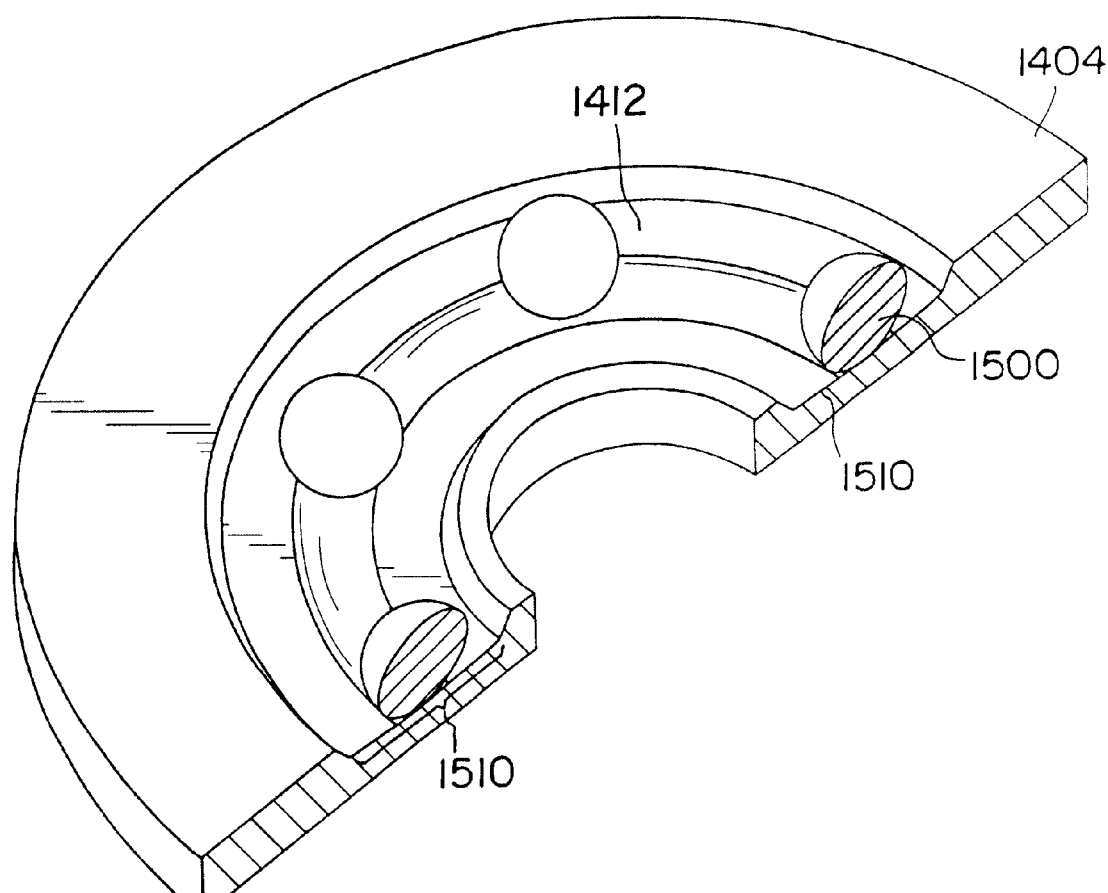
FIG. 17 is yet another perspective view of the VID shown in FIG. 14 with portions of the embodiment shown removed.

VID 1400 also includes substantially matching circular raceways 1510 and 1512 formed in lower section 1404 and upper section 1402, respectively. A plurality of balls 1500 are disposed between raceways 1510 and 1520, and lie within a plurality of holes formed in retainer ring 1406 (as depicted in FIG. 16). In the present embodiment, six balls are substantially equally spaced at b 60degree increments by retainer ring 1406. Raceways 1510 and 1512 have substantially conical cross sections with rounded apexes. Horizontal displacement of VID 1400 causes displacement of plurality of balls 1500 onto the conical cross sections of raceways 1510 and 1512. Gravity then restores plurality of balls 1500 to the apexes of raceways 1510 and 1520. Accordingly, the substantially constant slope of the conical sections of raceways 1510 and 1512 facilitates broadband vibration isolation in the horizontal plane. Additionally, when plurality of balls 1500 approach the end of their stroke lengths, spring rings 1408 exert a small compression force to urge plurality of balls 1500 back to their rest positions. Spring rings 1408 also hold upper and lower sections 1402 and 1404 together during shipping, transportation, and installation. Moreover, spring rings 1408 preferably aid in centering plurality of balls 1500 and raceways 1510 and 1512 prior to loading.

Figure 18:
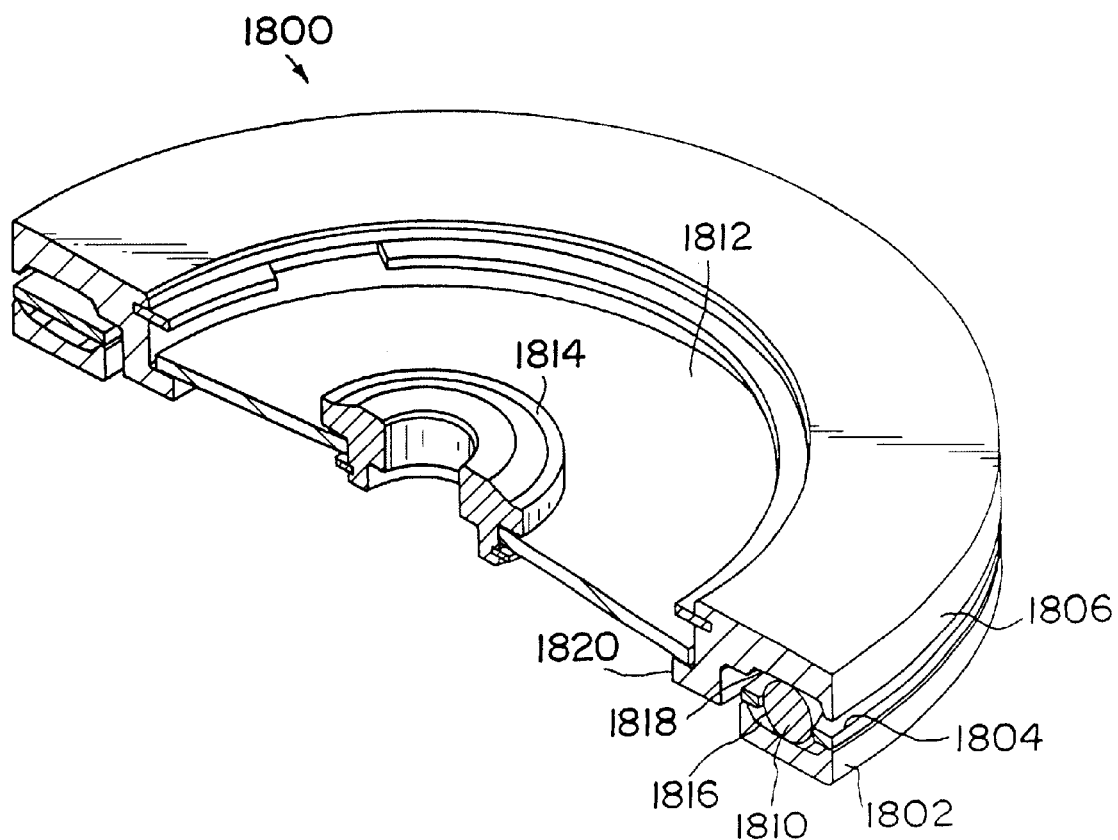
FIG. 18 is a perspective view of a VID in accordance with another embodiment of the present invention.

With reference to FIG. 18, in accordance with another embodiment of the present invention, VID 1800 is configured as a particularly low profile device. VID 1800 includes lower and upper rings 1802 and 1806 configured with substantially matching circular raceways 1816 and 1818, respectively. A plurality of balls 1810 are disposed between raceways 1816 and 1818, and lies within a plurality of holes formed in retainer ring 1804. Conic washer 1812 is configured on shoulder 1820 formed around the interior circumference of upper ring 1806. In a manner similar to previously described embodiments, the configuration of balls 1810 trapped between raceways 1816 and 1818, and conic washer 1812 provide broadband vibration isolation for a load mounted on base ring 1814. In a preferred embodiment, three balls are disposed at equally spaced 120 degree increments, and conic washer 1812 is preferably a Belleville or ZK washer with aspect ratios of 1.5.

In a most preferred embodiment, the diameter of VID 1800 is between three to nine inches and height of 1 inch or less. The stroke length in all direction is 3/16th of an inch and the natural frequency is 1/5th Hz for ideal rated load and 2 Hz at plus or minus 50 percent of the ideal rated load, where the ideal rated load is 4,000 pounds.

With reference to FIGS. 19–22, in accordance with yet another embodiment of the present invention, VID 1900 includes top portion 1930, bottom portion 1940, and plurality of conic washers 2220 disposed between top portion 1930 and bottom portion 1940. Top portion 1930 and bottom portion 1940 are suitably configured with bores 2060 and 2250, respectively. Compression spring 2240 suitably extends through bores 2060 and 2250, and attached to upper portion 1930 by anchor bar 1920 and bottom portion 1940 by anchor bar 2010. Compression spring 2240 precompresses plurality of conic washers 2220 such that plurality of conic washers 2220 exhibit substantially zero tangential stiffness and high secant stiffness. Accordingly, VID 1900 provides broadband isolation of vibration primarily along the z-axis. In a preferred embodiment, plurality of conic washers 2220 include Belleville or ZK washers with aspect ratios of approximately 1.5.

With reference to FIG. 23, in accordance with still another embodiment, VID 2300 includes base 2310, mounting bracket 2330, and adjustment cap 2350. A plurality of conic washers 2320 and 2340 are suitable disposed between base 2310 and bracket 2330, and between bracket 2330 and adjustment cap 2350, respectively. Adjustment bolt 2360 extends up from base 2310 through mounting bracket 2330 and is suitably attached to adjustment cap 2350 with adjustment nut 2370. Plurality of conic washers 2320 and 2340 may be calibrated for lighter or heavier loads by tightening or loosening adjustment bolt 2370. More particularly, when adjustment bolt 2370 is suitably tightened, adjustment nut 2370 engages with plurality of teeth on adjustment bolt 2360 and adjustment cap 2350 lowers, to compress plurality of conic washers 2320 and 2340. Conversely, when adjustment bolt 2370 is suitably loosened, adjustment cap 2350 rises to expand plurality of conic washers 2320 and 2340.

Mounting bracket 2330 is suitably attached to a load, and plurality of washers 2320 and 2340 provide broadband isolation of vibration primarily along the z-axis. In a preferred embodiment, plurality of conic washers 2320 and 2340 are Belleville or ZK washers.

Figure 24:
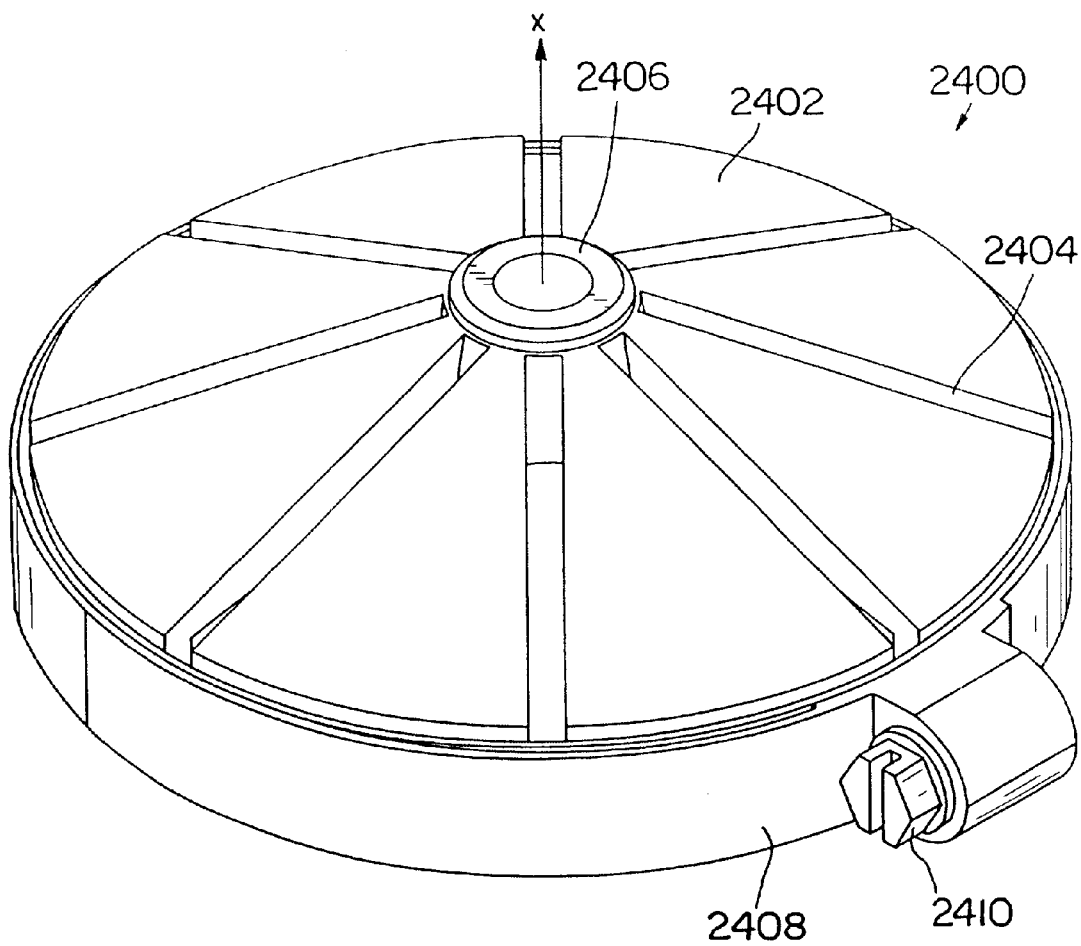
FIG. 24 is a perspective view of a VID in accordance with still another embodiment of the present invention.
Figure 25:
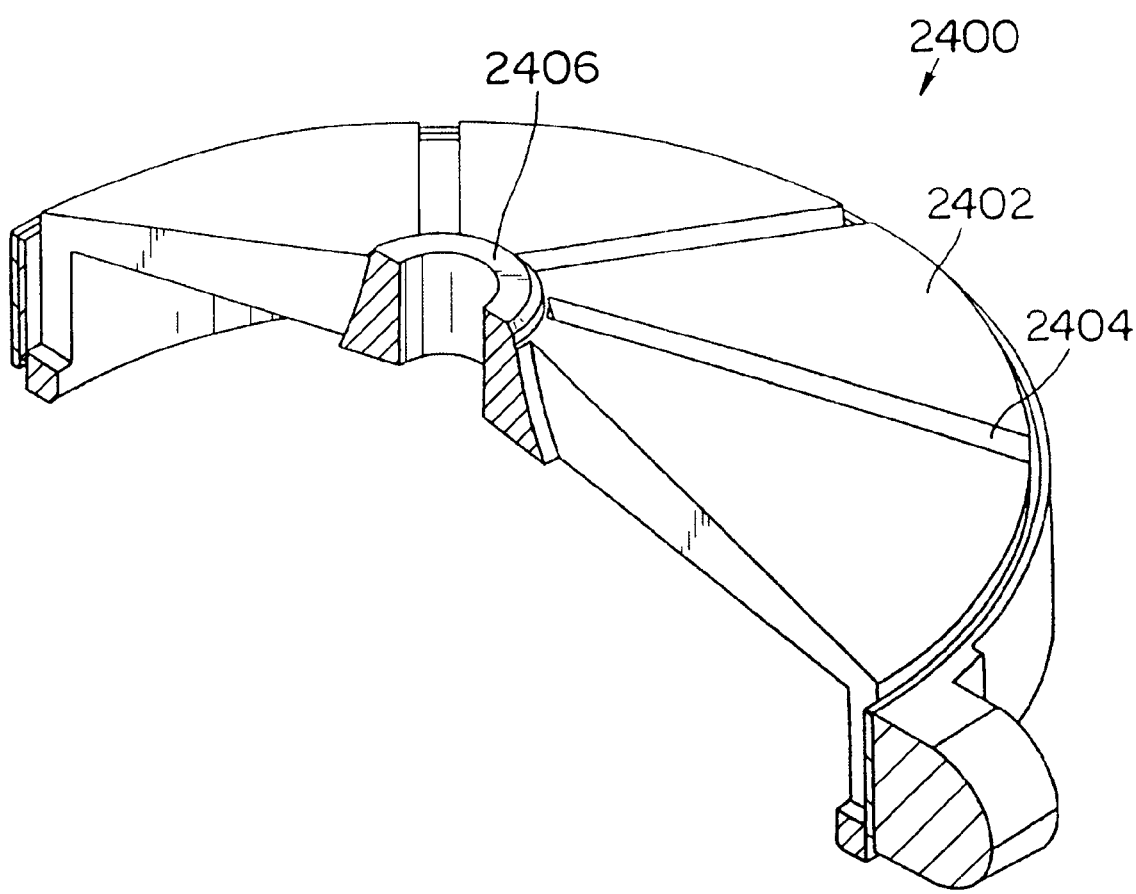
FIG. 25 is a perspective view of the VID shown in FIG. 24 with portions of the embodiment shown removed.

With reference to FIGS. 24 and 25, in accordance with a further embodiment of the present invention, VID 2400 includes base ring 2406, ZK washer 2402, compression band 2408, and adjustment bolt 2410. A load is suitably mounted on base ring 2406. ZK washer 2402 exhibits substantially zero tangential stiffness and high secant stiffness, thus providing broadband vibration isolation primarily along axis z. More particularly, ZK washer 2402 is preferably a two-tiered ZK washer, such that the vertical cross section of ZK washer 2402 is substantially equal to the horizontal cross section. Accordingly, the stresses exerted on ZK washer 2402 is substantially uniform. Additionally, compression band 2408 is suitably configured around the outer circumference of VID 2400 such that the spring aspect ratio of ZK washer 2402 may be altered by appropriately loosening or tightening adjustment bolt 2410. ZK washer 2402 may be provided with slots 2404.

Figure 26:
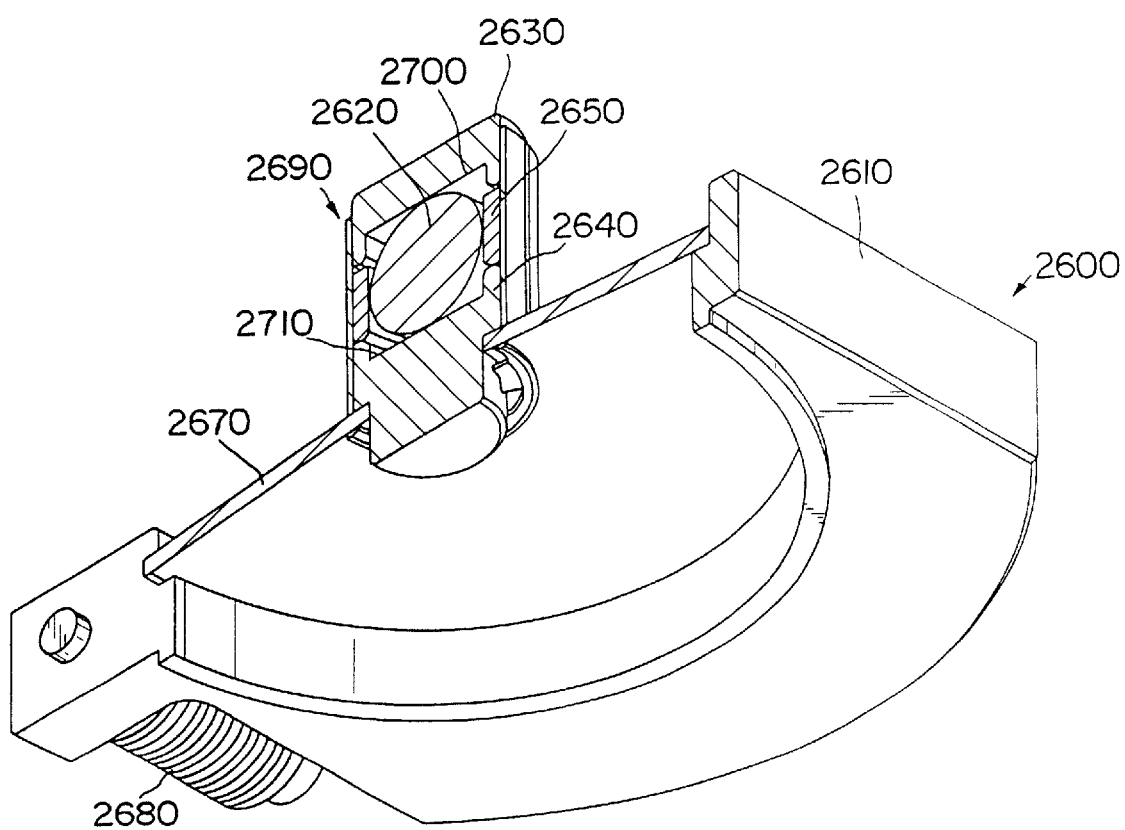
FIG. 26 is a cross sectional view of a VID in accordance with yet another embodiment of the present invention.

With reference to FIG. 26, in accordance with another embodiment of the present invention, VID 2600 includes frame 2610, ball-in-cone assembly 2690, conic washer 2670, and spring aspect ratio adjustment screw 2680. Ball-in-cone assembly 2690 includes conic recesses 2700 and 2710 formed in upper section 2630 and lower section 2640, respectively. Ball 2620 is preferably disposed between recesses 2700 and 2710, and lie within a hole formed in retainer ring assembly 2690 suitably provides broadband isolation of vibration along the horizontal plane.

Conic washer 2670 is preferably disposed within substantially circular inner perimeter of frame 2610. Adjustment screw 2680 may be suitably loosened or tightened to decrease or increase, respectively, the spring aspect ratio of conic washer 2670. In this manner, conic washer 2670 provides broadband isolation along the vertical plane for loads mounted on upper section 2630. In a preferred embodiment, conic washer 2670 is preferably a Belleville or ZK washer.

Although specific embodiments and parameters have been described, various modifications may be apparent upon reading this disclosure. For example, although Belleville and ZK washers have been used as conic washers in various embodiments, other suitable nonlinear spring elements with the requisite stiffness characteristics such as EPDM rubber may be used.

What is claimed is:

1. A passive vibration isolation device for reducing transmissibility in a broad frequency range of vibration, said device comprising: a plurality of near zero effective stiffness elements, wherein said plurality of stiffness elements respond to the broad frequency range of vibration with low tangent stiffness and high secant stiffness, and wherein one of said plurality of stiffness elements is a housing member having a plurality of raceways contained therein and a plurality of spherical members contained within said plurality of raceways.

2. The device in accordance with claim 1, wherein said housing member further comprises:
    a first cylindrical section;
    a second cylindrical section having substantially the same diameter as said first cylindrical section; and
    at least one of said plurality of raceways formed in each of said first and second cylindrical sections.

3. A device in accordance with claim 1 wherein one of said plurality of stiffness elements comprises a non-linear spring device.

4. A device in accordance with claim 1 wherein one of said plurality of raceways are configured as dimples.

5. A device in accordance with claim 4 wherein said dimples are spherical.

6. A device in accordance with claim 4 wherein said dimples are conical.

7. A device in accordance with claim 3 wherein said non-linear spring device is a crest-to-crest spring.

8. A device in accordance with said claim 1 wherein one of said plurality of stiffness elements comprises a plurality of conic washers.

9. A device in accordance with claim 8 wherein said plurality of conic washers are Belleville washers.

10. A device in accordance with claim 8 wherein said plurality of conic washers are ZK washers.

* * * * *